United States Patent [19]

Sakakibara

[11] Patent Number: 4,557,354
[45] Date of Patent: Dec. 10, 1985

[54] ATTACHMENT OF SEALING BOOT IN DISC BRAKE ASSEMBLY

[75] Inventor: Shigemi Sakakibara, Toyota, Japan

[73] Assignee: Toyota Jidosha Kabushiki Kaisha, Toyota, Japan

[21] Appl. No.: 516,278

[22] Filed: Jul. 22, 1983

[30] Foreign Application Priority Data

Jul. 28, 1982 [JP] Japan ............................ 57-114218[U]

[51] Int. Cl.⁴ ............................................. F16D 65/00
[52] U.S. Cl. ............................ 188/73.45; 277/212 FB
[58] Field of Search .......... 188/73.45, 73.44, 366-370, 188/73.31; 277/212 FB, 171, 177

[56] References Cited

U.S. PATENT DOCUMENTS 4,121,845 10/1978 Reynolds et al. ............. 277/212 FB
4,438,832 3/1984 Nomura ............................ 188/73.45

FOREIGN PATENT DOCUMENTS 1233102 5/1960 France ........................... 277/212 FB Primary Examiner—Douglas C. Butler
Attorney, Agent, or Firm—Kenyon & Kenyon

[57] ABSTRACT

In a disc brake assembly which comprises a pair of parallel guide pins fixed to a torque member, a movable caliper having a pair of support arms, each arm being axially slidable on a respective one of the guide pins, and a pair of tubular sealing boots for each guide pin, the two boots of each pair having inner ends attached to a corresponding one of the support arms and having outer ends attached to the corresponding one of the guide pins, each of the guide pins is provided with axially spaced inner and outer annular grooves located at the opposite sides of the support arm, and the sealing boot located on the outer side of the corresponding one of the support arms is formed at its inner end with an inner cylindrical sealing portion fixed to the support arm and at its outer end with an outer cylindrical sealing portion coupled within the outer annular groove of the guide pin. The outer annular groove of the guide pin is provided at its outer side wall with an annular projection which extends axially inwardly to press radially inwardly the outer sealing portion of the boot.

2 Claims, 5 Drawing Figures

ATTACHMENT OF SEALING BOOT IN DISC BRAKE ASSEMBLY

BACKGROUND OF THE INVENTION

The present invention relates to a disc brake assembly of the movable caliper type, and more particularly to a disc brake assembly of the movable caliper type which comprises a pair of parallel guide pins fixed to a stationary torque member, a movable caliper member having a pair of support arms, each arm being axially slidable on a corresponding one of the guide pins, and a pair of tubular sealing boots for each support arm, the boots of each pair having inner ends attached to opposite sides of the corresponding of the support arms and having outer ends attached to the corresponding one of the guide pins in such a way as to enclose a pair of annular openings formed between the support arm and the guide pin at opposite outer and inner sides of the support arm.

In a conventional disc brake assembly of this kind, the tubular sealing boots are provided to prevent entry of water, dirt, dust and the like into the annular openings between the guide pin and the support arm so as to ensure smooth operation of the disc brake assembly. For example, as is illustrated in FIG. 5, a guide pin 3 fixed to a torque member is provided at opposite outer and inner end portions with a pair of annular grooves 3a, 3b, and respectively and a pair of tubular sealing boots 1 and 2 are fixedly coupled at their outer sealing ends 1a, 2a within the annular grooves 3a, 3b of guide pin 3. Although in such attachment of the tubular sealing boots 1, 2, the respective outer sealing ends 1a, 2a are engaged within the annular grooves 3a, 3b with a predetermined press fit, the outer sealing end 1a of boot 1 is apt to be upturned and removed by a jet of water acting thereon during car washing under high pressure. This results in entry of water, dirt, dust and the like into the interior of boot 1, causing an obstacle in operation of the brake assembly.

SUMMARY OF THE INVENTION

It is, therefore, a primary object of the present invention to provide an improved attachment of a tubular sealing boot in a disc brake assembly as described above, in which an outer cylindrical sealing portion of the sealing boot is reliably retained in place in a simple construction to resist displacement by a jet of water acting thereon during car washing under high pressure.

According to one aspect of the present invention there is provided a disc brake assembly which comprises a pair of parallel guide pins fixed to a stationary torque member, a movable caliper member having a pair of support arms, each arm being axially slidable on a corresponding one of the guide pins, and a pair of tubular sealing boots for each support arm, the two boots of each having inner ends attached to opposite sides of the corresponding one of the support arms and having outer ends attached to the corresponding one of the guide pins in such a way to enclose a pair of annular openings formed between the support arm and the guide pin at opposite inner and outer sides of the support arm, and in which each of the guide pins is provided at inner and outer opposite end portions with respective inner and outer annular grooves spaced axially from the opposite inner and outer sides of the support arm, and the sealing boot located on the outer side of each of the support arms is formed at its inner end with an inner cylindrical sealing portion fixed in a usual manner to the support arm and at its outer end with an outer cylindrical sealing portion coupled within the outer annular groove of the guide pin. In such attachment of the sealing boots as described above, the outer annular groove of the guide pin is provided at its outer side wall with an annular projection which extends axially inwardly and is arranged to press radially inwardly the outer cylindrical sealing portion of the boot and to retain it in place.

Alternatively, it is preferble that the outer annular groove of the guide pin is provided at its outer side wall with a plurality of equiangularly spaced axial projections which extend axially inwardly and are arranged to press radially inwardly the outer cylindrical sealing portion of the boot and to retain it in place. Preferably, the axial projections are curved toward the bottom of the outer annular groove of the guide pin.

BRIEF DESCRIPTION OF THE DRAWINGS

Additional objects and advantages of the present invention will become readily apparent from the following detailed description of a preferred embodiment thereof when taken together with the accompanying drawings, in which.

DETAILED DESCRIPTION OF THE PREFERRED EMBODIMENTS

Figure 1:
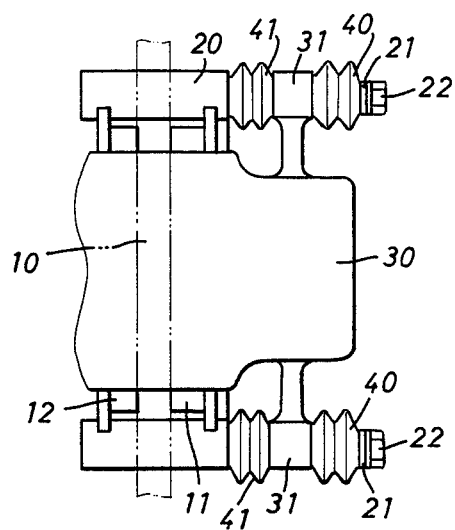
FIG. 1 is a front view of a disc brake assembly to which the present invention is applied.

Referring now to the drawings, FIG. 1 illustrates a disc brake assembly of the movable caliper type to which the present invention is applied. The disc brake assembly includes a rotary disc 10 secured for rotation with a vehicle wheel, a stationary torque member 20 straddling the rotary disc 10, a pair of brake friction pad assemblies 11, 12 axially slidable on torque member 20 to be pressed against the opposite faces of rotary disc 10 in braking operation, a pair of parallel guide pins 21, 21 fixed to torque member 20, and a movable caliper member 30 axially slidable on guide pins 21, 21.

Figure 2:
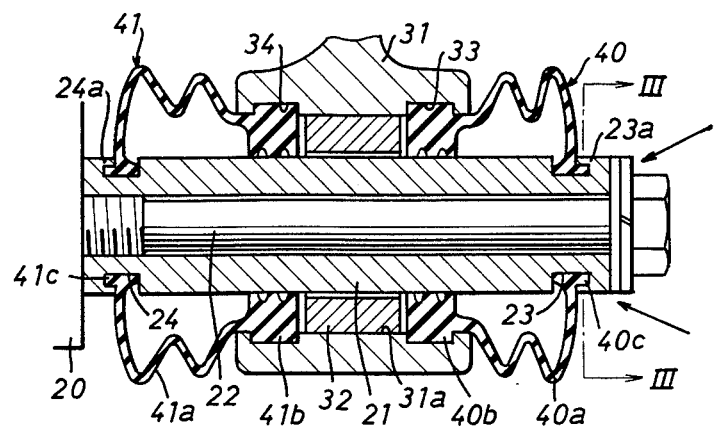
FIG. 2. is an enlarged sectional view of a main portion of FIG. 1.
Figure 5:
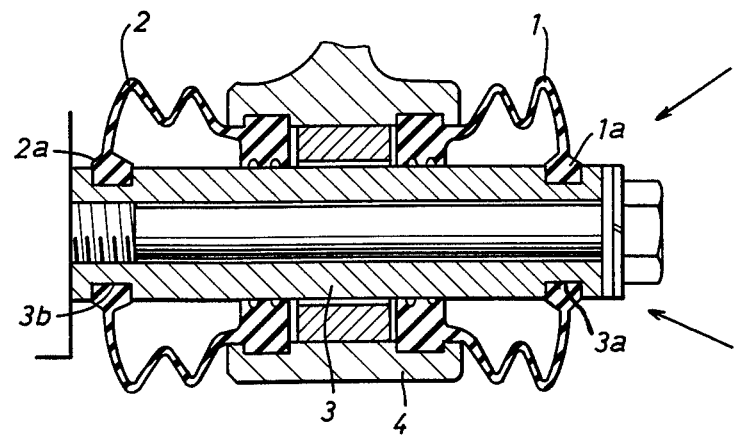
FIG. 5 is an enlarged sectional view of a conventional attachment of a tubular sealing boot which corresponds with the illustration of FIG. 2.

As is illustrated in FIG. 2, each of guide pins 21, 21, is in the form of a sleeve-like support pin which is fixed to torque member 20 by means of a bolt 22 threaded into torque member 20. The caliper member 30 has a pair of support arms 31, 31 which are respectively formed therein with an axial through bore 31a to be arranged in a coaxial relationship with guide pin 21. The movable caliper member 30 is axially slidably mounted on the guide pins 21, 21 through metal bearings 32 each of which is fixed within the axial through bore 31a of support arm 31. In such arrangement, a pair of tubular sealing boots 40 and 41 are attached at one end thereof to each of support arms 31 and at the other end thereof to each of guide pins 21. In a situation where the disc brake assembly is mounted on a vehicle body structure, the sealing boots 40, 41 are located inside in relation to rotary disc 10.

Each of sealing boots 40, 41 is made of elastic material such as synthetic rubber or the like. The inside sealing boot 40 includes a tubular bellows portion 40a which is integrally formed at its inner end with a cylindrical sealing portion 40b and at its outer end with a cylindrical sealing portion 40c. On the other hand, the outside sealing boot 41 includes a tubular bellows portion 41a which is integrally formed at its inner end with a cylindrical sealing portion 41b and at its outer end with a cylindrical sealing portion 41c. Both the inner sealing portions 40b, 41b of the boots are respectively coupled with annular grooves 33 and 34 which are formed in parallel to each other in the opposite end portions of axial through bore 31a of support arm 31, each of inner sealing portions 40b, 41b being formed at its inner periphery with two parallel annular grooves. Meanwhile, both the outer sealing portions 40c and 41c are respectively coupled within annular grooves 23 and 24 which are formed in the opposite end portions of guide pin 21. Thus, the sealing boots 40, 41 are attached to each of support arms 31 and to each of guide pins 21 such that each annular opening between support arms 31 and guide pins 21 is closed in a fluid tight manner to prevent entry of water, dirt, dust and the like into the sealing boots 40, 41.

Figure 3:
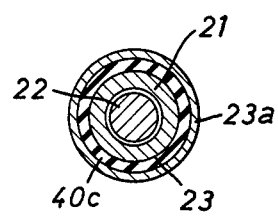
FIG. 3 is a cross-sectional view taken along line III—III in FIG. 2.

In such attachment of the sealing boots 40, 41 as described above, the outside wall of annular groove 23 is formed at its outer rim with an annular projection 23a which extends axially inwardly in parallel with the bottom of groove 23. The annular projection 23a of groove 23 is arranged to press radially inwardly the outer sealing portion 40c of boot 40 and to retain it in place as is illustrated in FIG. 3. The outside wall of annular groove 24 is also formed at its outer rim with an annular projection 24a which extends axially inwardly in parallel with the bottom of groove 24. The annular projection 24a of groove 24 is arranged to press radially inwardly the outer sealing portion 41c of boot 41 and to retain it in place. Thus, the provision of annular projections 23a, 24a at respective annular grooves 23, 24 serves to retain the outer sealing portions 40c, 41c of respective boots 40, 41 against a jet of water acting thereon during car washing under high pressure as is illustrated by arrows in FIG. 2. As a result, both the sealing boots 40, 41 act to reliably prevent entry of water, dirt, dust and the like so as to ensure smooth operation of the disc brake assembly for a long period of time.

Figure 4:
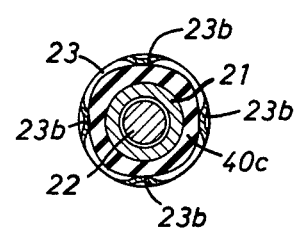
FIG. 4 is a cross-sectional view of a modification which corresponds with the illustration of FIG. 3.

In FIG. 4 there is illustrated a modification of the above embodiment in which the outside upright wall of annular groove 23 is formed at its outer rim with four equiangularly spaced axial projections 23b which extend axially inwardly and are curved toward the bottom of groove 23. The axial projections 23b are arranged to press radially inwardly the outer sealing portion 40c of boot 40 and to retain it in place. In the actual practice of the present invention, the annular projection 24a at groove 24 may be eliminated, but the provision of annular projection 23a at groove 23 is essential to prevent unexpected removal of the outer sealing portion 40c of boot 40.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a disc brake assembly which comprises a pair of parallel guide pins fixed to a stationary torque member, a movable caliper member having a pair of tubular sealing boots for each support arm, the two boots of each pair having inner ends attached to the corresponding one of said support arms and having outer ends attached to the correspondone of said guide pins in such a way as to enclose a pair of annular openings formed between said support arm and said guide pin at opposite inner and outer sides of said support arm, and in which each of said guide pins is formed at opposite inner and outer end portions with respective inner and outer annular grooves spaced axially from the opposite inner and outer sides of said support arm, and said sealing boot located on the outer side of each of the support arms includes an inner cylindrical sealing portion fixed to said support arm, an outer cylindrical sealing portion coupled within the outer annular groove of said guide pin, and an intermediate tubular bellows portion integrally formed with the inner and outer cylindrical sealing portions, the improvement wherein the outer annular groove of said guide pin is integrally formed at its outer side wall with a plurality of equiangularly spaced axial projections which extend inwardly and are arranged to press radially inwardly the outer cylindrical sealing portion of said boot against the bottom surface of said outer annular groove and to retain said outer cylindrical sealing portion in place.

2. The improvement as claimed in claim 1, wherein said axial projections are curved toward the bottom of the annular groove of said guide pin.

* * * * *

UNITED STATES PATENT AND TRADEMARK OFFICE
CERTIFICATE OF CORRECTION

PATENT NO. : 4,557,354

DATED : December 10, 1985

INVENTOR(S) : S. Sakakibara

It is certified that error appears in the above-identified patent and that said Letters Patent is hereby corrected as shown below:

Column 1, line 13, change "the boots of" to --the two boots of--.

Column 1, line 15, between "corresponding" and "of" insert the word --one--.

Column 1, line 28, change "3a, 3b, and respectively and a pair" to --3a, 3b, respectively, and a pair--.

Column 1, line 56, between "each" and "having" add the word --pair--.

Column 1, line 63, change "inner and outer opposite" to --opposite inner and outer--.

UNITED STATES PATENT AND TRADEMARK OFFICE
CERTIFICATE OF CORRECTION

PATENT NO. : 4,557,354

DATED : December 10, 1985

INVENTOR(S) : S. Sakakibara

It is certified that error appears in the above-identified patent and that said Letters Patent is hereby corrected as shown below:

Column 2, line 10, change "preferble" to --preferable--.

Signed and Sealed this

Twenty-seventh Day of May 1986

[SEAL]

Attest:

Attesting Officer

DONALD J. QUIGG

Commissioner of Patents and Trademarks